United States Patent
Taylor et al.

(12)

(10) Patent No.: US 6,840,042 B1
(45) Date of Patent: Jan. 11, 2005

(54) INTERNAL FILTER

(75) Inventors: Michael Taylor, Sullivan, IL (US); Jeffrey A. Wilson, Mattoon, IL (US); Thomas Kopel, Sullivan, IL (US); Neil Brandenburg, Neoga, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 31 days.

(21) Appl. No.: 10/462,992

(22) Filed: Jun. 17, 2003

(51) Int. Cl.[7] .............................................. F16D 31/02
(52) U.S. Cl. ........................................ 60/454; 60/487
(58) Field of Search ..................... 60/453, 454, 464, 60/465, 466, 467, 468, 487; 92/12.2

(56) References Cited

U.S. PATENT DOCUMENTS

| | | | |
|---|---|---|---|
| 2,460,058 A | * | 1/1949 | Brodeur ..................... 60/454 |
| 3,357,179 A | * | 12/1967 | Gourlay et al. ............... 60/463 |
| 4,891,943 A | | 1/1990 | Okada |
| 4,899,541 A | | 2/1990 | Okada et al. |
| 4,905,472 A | | 3/1990 | Okada |
| 5,046,994 A | | 9/1991 | Hasegawa et al. |
| 5,311,740 A | * | 5/1994 | Shiba et al. ................. 60/453 |
| 5,456,068 A | | 10/1995 | Ishii et al. |
| 5,622,051 A | | 4/1997 | Iida et al. |
| 5,701,739 A | | 12/1997 | Ohashi et al. |
| 5,709,141 A | * | 1/1998 | Ohashi et al. ............... 92/12.2 |
| 6,105,464 A | | 8/2000 | Shimizu |
| 6,199,380 B1 | | 3/2001 | Ishii |
| 6,212,887 B1 | | 4/2001 | Takada |
| 6,324,842 B1 | | 12/2001 | Ishii |
| 6,397,966 B1 | | 6/2002 | Irikura et al. |
| 2001/0035013 A1 | | 11/2001 | Ishii et al. |
| 2001/0035014 A1 | | 11/2001 | Yano et al. |
| 2002/0104314 A1 | | 8/2002 | Johnson et al. |

* cited by examiner

*Primary Examiner*—Edward K. Look
*Assistant Examiner*—Igor Kershteyn
(74) *Attorney, Agent, or Firm*—Neal, Gerber & Eisenberg, LLP

(57) ABSTRACT

An internal filter that may be installed or removed from the outside of the housing. The internal filter may also cooperate with an inlet passage for a charge pump.

22 Claims, 16 Drawing Sheets

INTERNAL FILTER

BACKGROUND OF THE INVENTION

This invention relates generally to hydrostatic transmissions and similar hydraulic devices. This invention also relates to the design of filters and more particularly, to the design of an internal filter used with such devices and to the design of a fluid flow path from the filter to an inlet of a hydrostatic transmission center section, either directly or by means of a charging pump.

DESCRIPTION OF THE PRIOR ART

While it is known to provide an oil filter in conjunction with hydrostatic transmissions, providing such oil filters often adds complexity to a hydraulic device and may also create application difficulties, as some filters in compact hydrostatic devices are located below the center section and reduce the ground clearance or cause installation difficulties because of the volume required for the filter. Further, the addition of a charging pump adds to the complexity of the internal components and increases the difficulty of effectively positioning a filter.

Filters of various external and internal configurations for use in connection with hydrostatic transmissions and pumps are well known in the industry. For example, U.S. Pat. No. 5,613,409 shows an unlabeled internal filter attached to the bottom of a center section. This filter is smaller than an opening formed in the housing that is covered by a cap. Thus, by removing the cap, the filter may be accessed and removed without significant disassembly of the unit. Other internal filters that are currently used in the industry require significant disassembly of the transaxle before the filter may be removed or replaced. Similarly, externally attached filters are also known in the industry. However, external filters may be exposed to debris and risk being damaged. They may also expand the external volume required of the device to which they are attached. Lastly, fluid must travel into and out from an external filter, requiring a relatively complex interface, and an increased risk of leakage.

While the aforementioned filters work for their intended purpose, there is a need to reduce the complexity associated with replacing internal filters and the risk of leakage associated with external filters.

SUMMARY OF THE INVENTION

The invention shown herein comprises an internal filter that may be installed or removed from the outside of the housing. The internal filter may also cooperate with an inlet passage for a charge pump.

A better understanding of the objects, advantages, features, properties and relationships of the invention will be obtained from the following detailed description and accompanying drawings which set forth illustrative embodiments and are indicative of the various ways in which the principles of the invention may be employed.

DETAILED DESCRIPTION OF THE DRAWINGS

Figure 1:
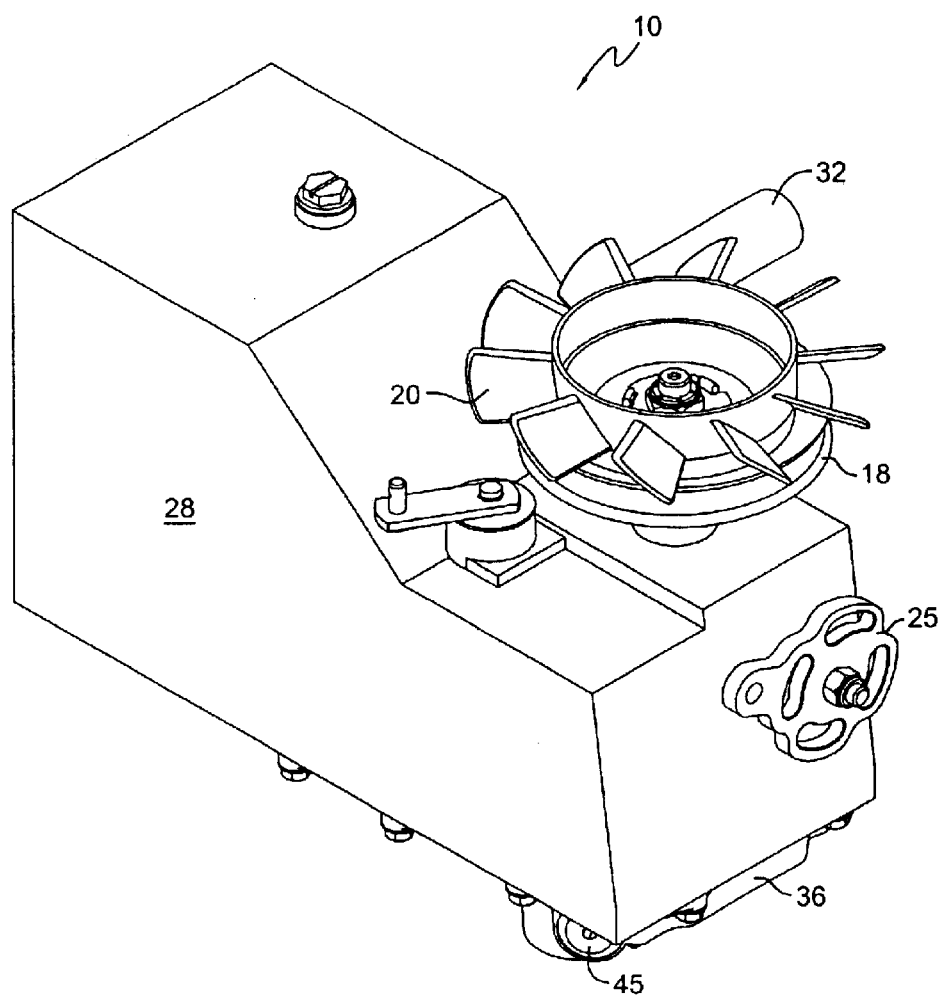
FIG. 1 is a perspective view of a transaxle incorporating the present invention.

FIGS. 1–5 show a hydrostatic transaxle 10 in which the present invention may be incorporated. Generally, hydrostatic transaxles operate on the principal of an input shaft 12 driving a hydraulic pump 14 and causing displacement of fluid to a hydraulic motor 16. As pump 14 rotates it displaces fluid through porting located in the center section (as described below) to drive motor 16. Input shaft 12 is also coupled to a prime mover such as a vehicle engine (not shown) either directly or by means of a belt driving a pulley 18. Input shaft 12 may optionally include a cooling fan 20.

Figure 5:
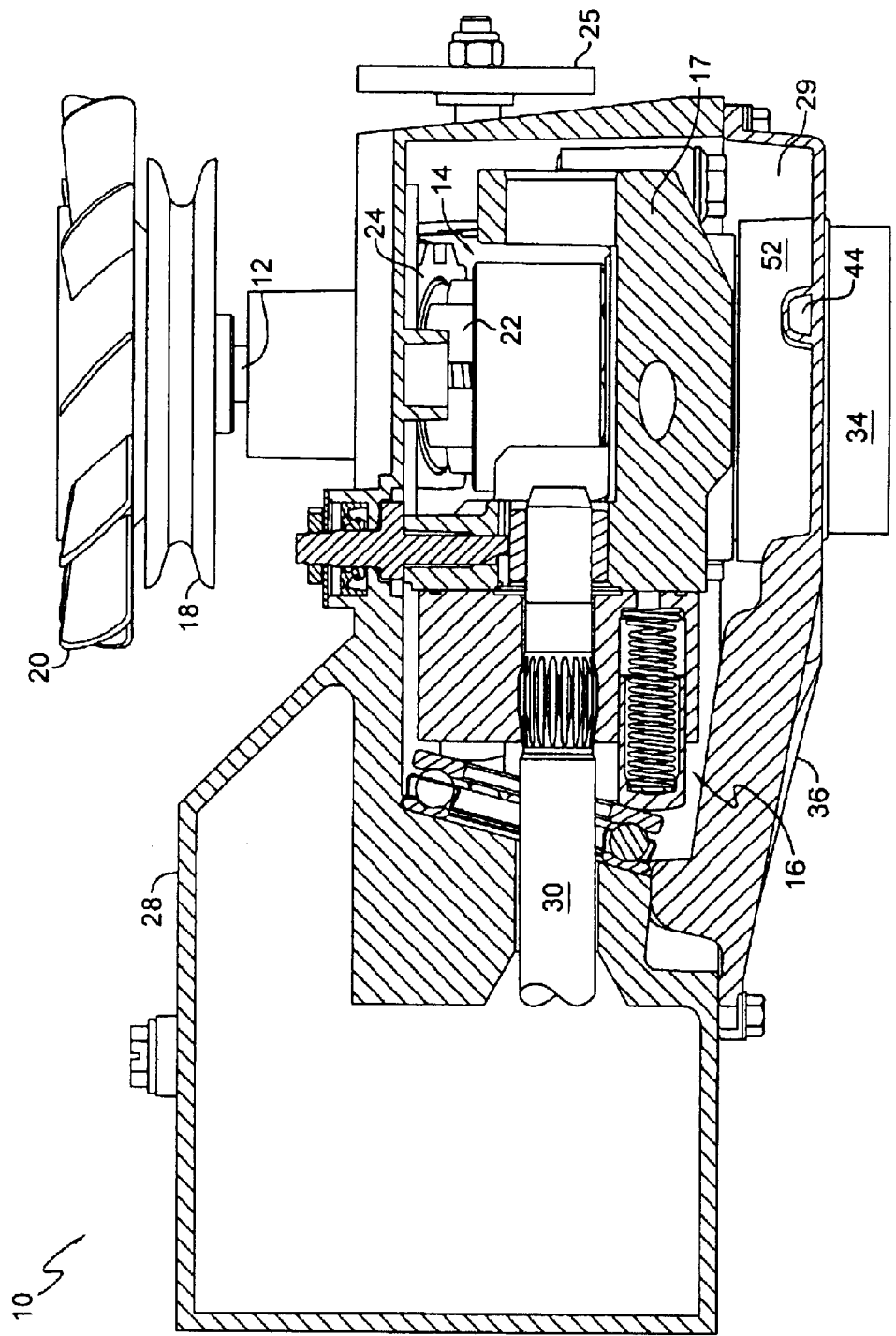
FIG. 5 is a section view of the transaxle taken along the lines 5—5 in FIG. 4.

For displacing fluid to motor 16, hydraulic pump 14 shown in FIG. 5 is provided; this hydraulic pump may be an axial piston pump, which contains pistons 22. To cause pistons 22 to displace fluid to motor 16, swash plate 24 may be moved by control arm 25. Control arm 25 may be connected to various types of mechanical, electric, hydraulic or pneumatic mechanisms capable of causing the movement of swash plate 24.

Although this description describes a hydrostatic transaxle containing an axial piston pump and axial piston motor, it should be appreciated that the disclosed embodiments may also be used in conjunction with a variety of hydraulic devices such as stand-alone hydraulic pumps or motors that may be of other configurations, such as radial piston, gerotor, and the like. For a more detailed description of the principles of operation of a hydrostatic transmission, the reader is referred to U.S. Pat. Nos. 5,314,387, and 6,322,474, which are incorporated herein by reference in their entirety. In addition, motor 16 may exist as an independent unit in a separate housing.

For driving axle shaft 32, motor 16 drives output shaft 30 that may be associated with other components such as gears. It should be understood that the output shaft may be accessible from the exterior of housing 28 and that motor 16 may drive two or more axle shafts by a variety of means, including a differential. Both pump 14 and motor 16 are operatively mounted on a center section 17, which contains hydraulic porting therein. It should also be understood by those with skill in the art that there are multiple center section configurations and that this invention may be readily configured to operate with all known center sections and center section equivalents.

Figure 2:
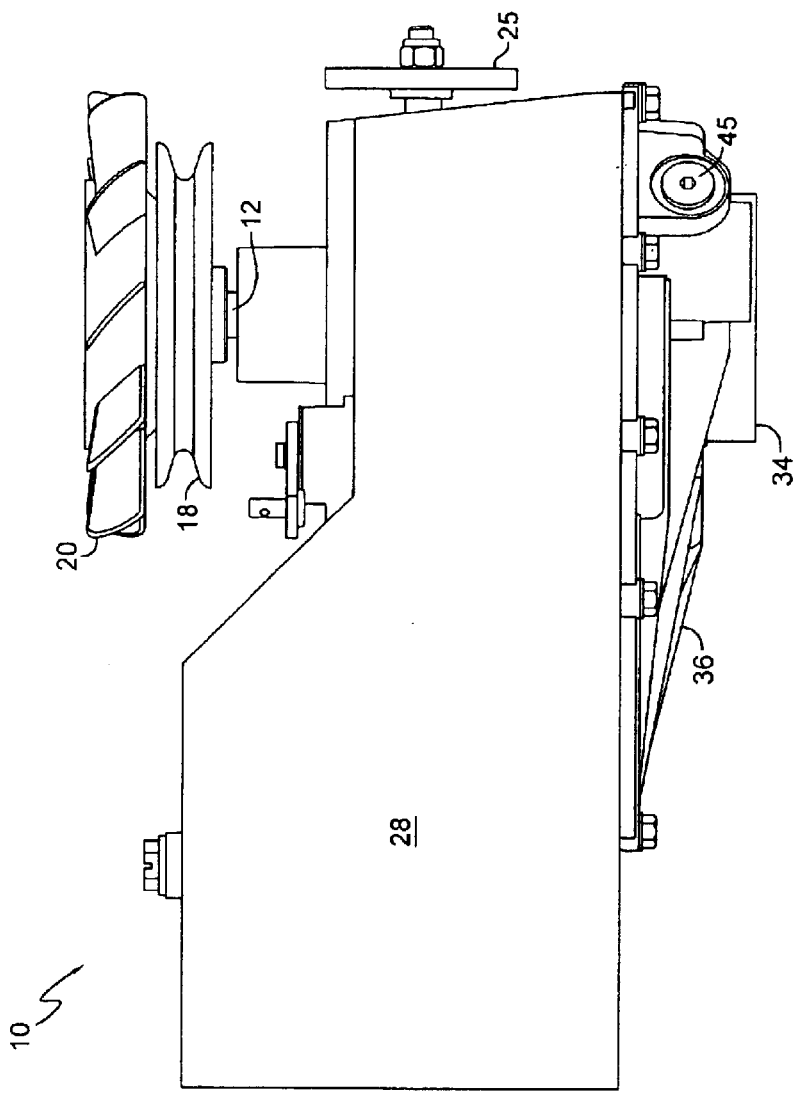
FIG. 2 is a side elevational view of the transaxle of FIG. 1.
Figure 3:
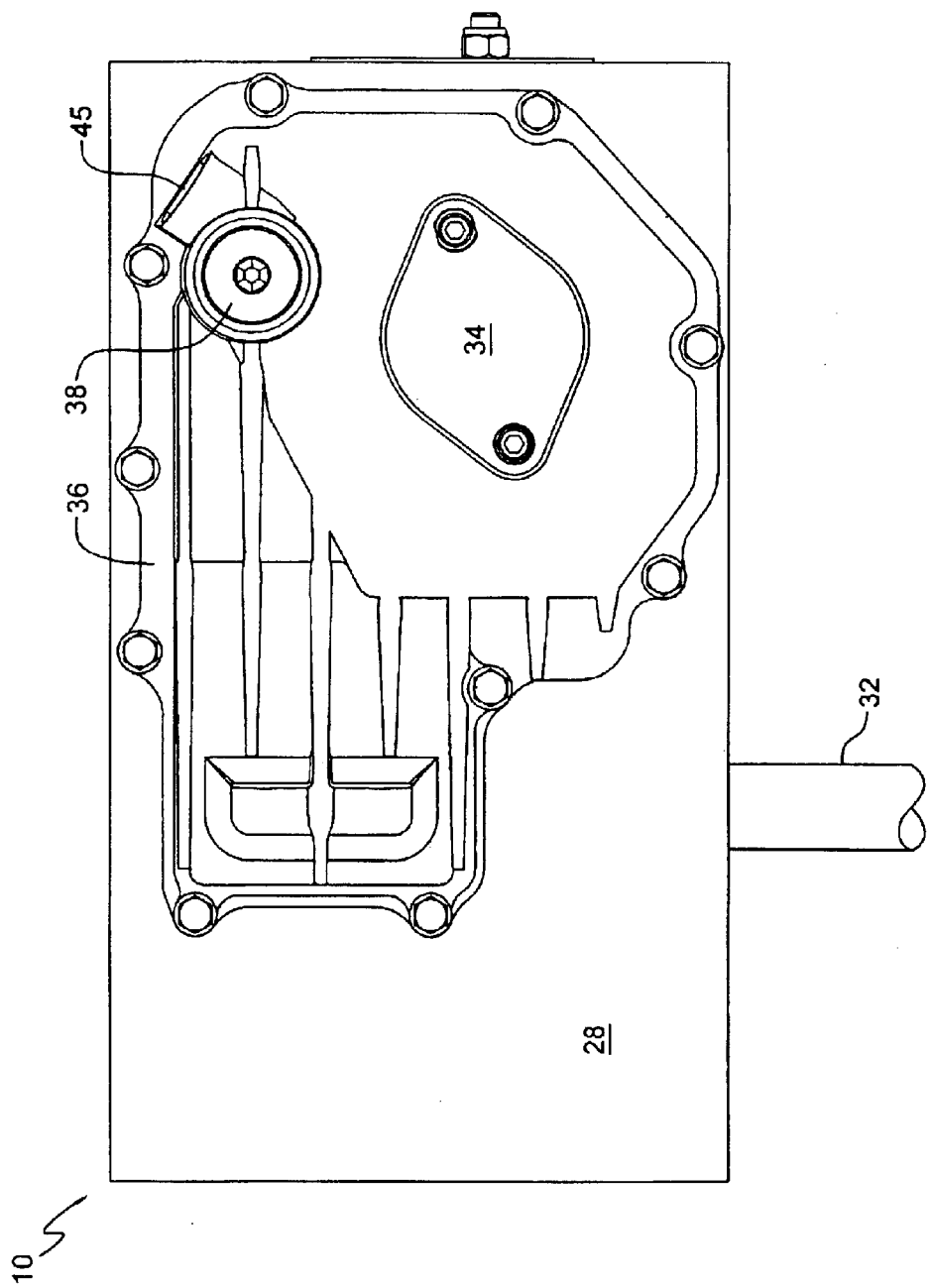
FIG. 3 is a bottom plan view of the transaxle of FIG. 1.
Figure 4:
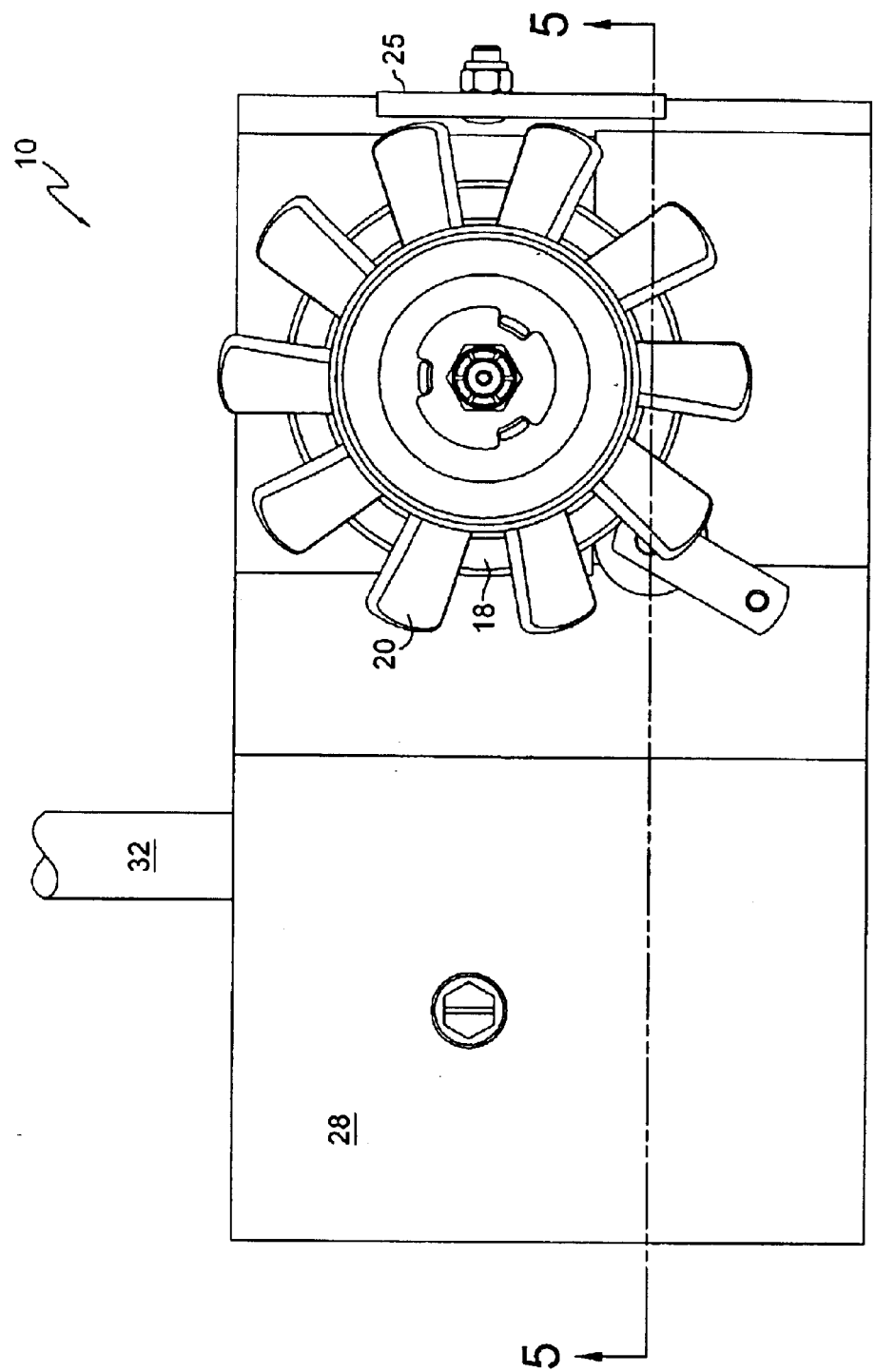
FIG. 4 is a top plan view of the transaxle of FIG. 1.

To aid in providing additional fluid to the porting that connects pump 14 and motor 16, a charge pump 34 may be provided. This additional fluid is necessary to makeup for fluid that may be lost due to expected leakage from pistons 22, under pump 14, motor 16 or other locations, such as bleeds and valves. An exemplary charge pump 34 is shown in FIGS. 2, 3, and 5. A filter may be included on an inlet to the porting between pump 14 and motor 16, including an inlet to charge pump 34 to increase the operational life of the hydraulic components.

FIG. 5 shows a housing 28 with a housing cover or portion 36, a sump 29 and a center section 17 positioned within sump 29. An inlet manifold 52 may be formed with or secured to center section 17 to provide a fluid gallery. For allowing fluid to flow between sump 29 and inlet manifold 52, housing cover 36 may include a fluid inlet or inlet passage 44. It should be understood by those with skill in the art that the shape and composition of the various housing elements herein described are not critical to the invention and that this invention could be used with a wide variety of housing configurations.

For removing impurities from fluid traveling from sump 29 (also referred to herein as the first fluid side) to inlet manifold 52 (also referred to herein as the second fluid side), a filter 38 may be provided. FIGS. 6, 7, 8, 9, and 11 show housing cover 36 with an opening 37, which is located between sump 29 and inlet passage 44 and which is capable of receiving a filter. Therefore, filter 38 may be installed within opening 37 to remove impurities from fluid as described above. It should be appreciated that filter 38 may be easily installed and removed from outside of housing 28, without requiring the removal of housing cover 36 or other components.

Filter 38 is comprised of a filter body 39 having a first end 39a, a second end 39b and a sidewall 39c, which joins first end 39a and second end 39b. One or more portions of side wall 39c of filter 38 are comprised of filter media 40. Filter media 40 allows fluid to pass through it, while simultaneously removing impurities therefrom. Fluid is pulled from sump 29 through filter media 40 by the action of hydraulic pump 14 or charge pump 34. This fluid then travels from filter media 40 into second end 39b of filter 38. The second end 39b of filter 38 is further comprised of a first support section 41a, a second support section 41b and a mid section 41c connecting first and second support sections 41a, 41b. For allowing fluid to flow from the first fluid side to the second fluid side, first support section 41a includes a passage 43 and mid section 41c includes at least one aperture. Passage 43 is in fluid communication with aperture 51 and the second fluid side, while aperture 51 is also in fluid communication with inlet passage 44. It should be understood that filter 38 may include a single aperture 51 or a plurality of apertures 51.

Figure 9:
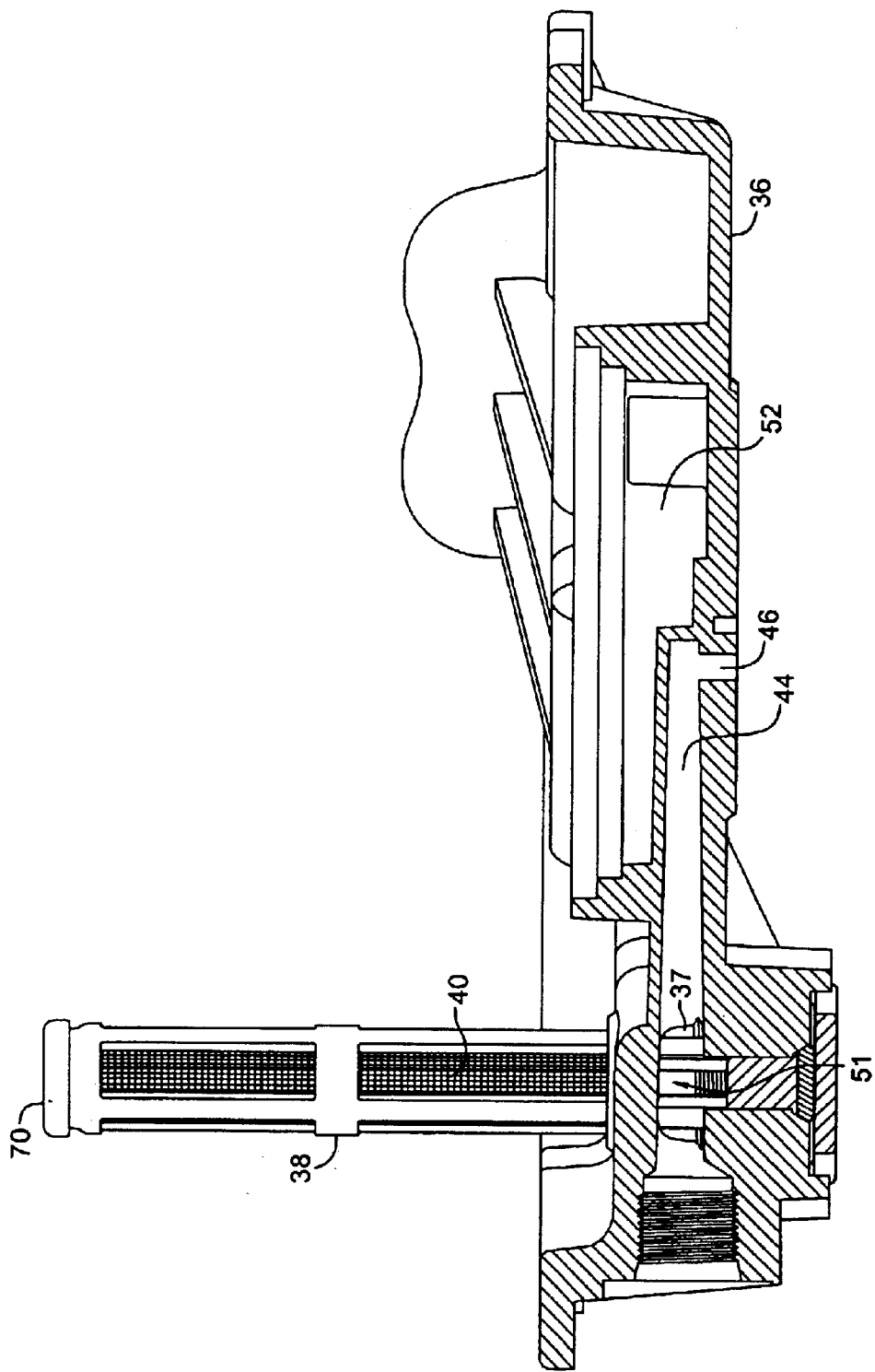
FIG. 9 is a section view of the housing cover shown in FIG. 6 along the lines 9—9 in FIG. 8.

Thus, fluid can flow from the first fluid side through filter media 40 in filter 38, through passage 43 in first support section 41a, through aperture 51 in mid section 41c and into inlet passage 44, which is formed in housing cover 36. As shown in FIGS. 5 and 9, the fluid continues to travel through inlet passage 44 to charge pump passage 46, which may be connected to charge pump 34. Since inlet passage 44 is preferably formed after housing cover 36 has been molded, plug 45 is used to seal inlet passage 44. Housing cover 36 may also be designed to include inlet passage 44 as part of the molding process, thereby alleviating the need for plugging any portion of inlet passage 44.

Figure 11:
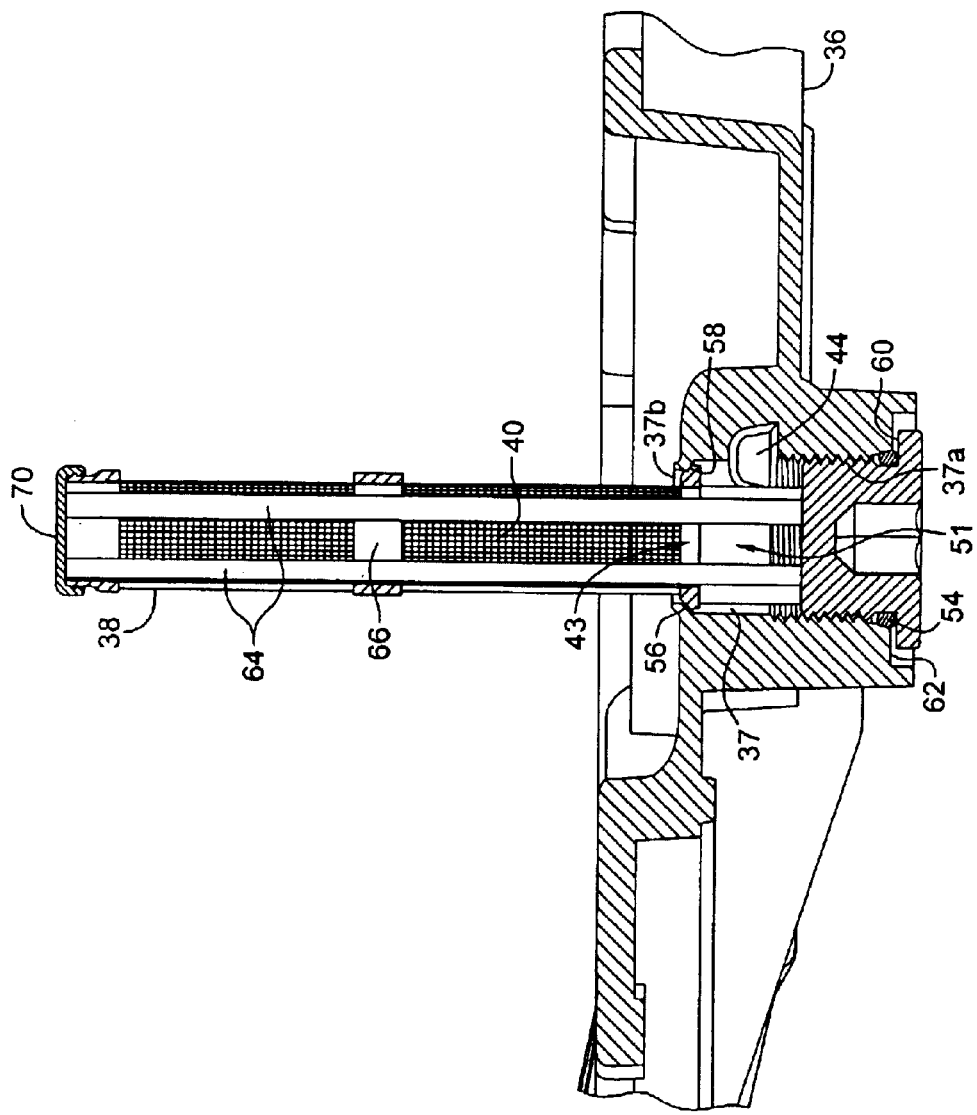
FIG. 11 is a section view of the housing cover shown in FIG. 6 along the lines 11—11 in FIG. 8.
Figure 13:
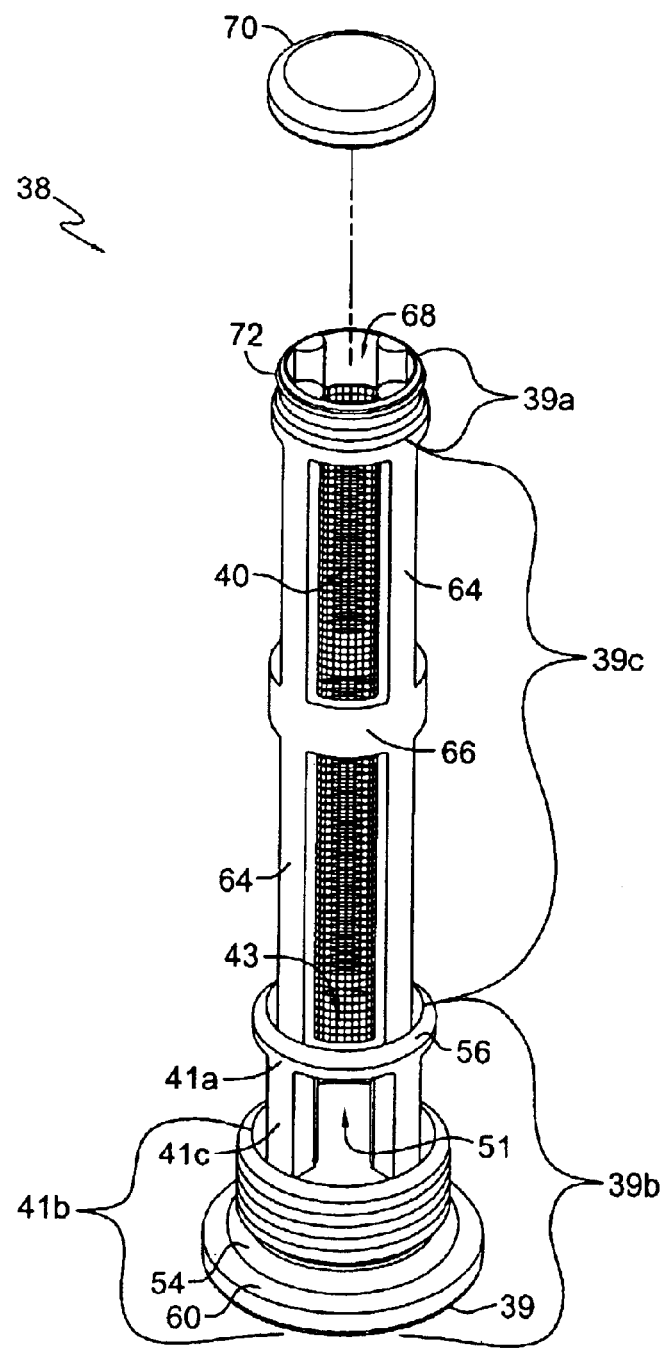
FIG. 13 is a perspective view of the internal filter shown in FIGS. 1–11.

As shown in FIGS. 11 and 13, for securely mounting filter 38 to housing 36 within opening 37, first support section 41a and second support section 41b are designed to fit within opening 37 and to assume a mating relationship with housing cover 36. Opening 37 may also be designed to have a first end 37a located on the exterior surface of housing cover 36 and a second end 37b located on the interior surface of housing cover 36 where the diameter of first end 37a is larger than the diameter of the second end 37b. To achieve a mating relationship with housing cover 36, second support section 41b of filter 38 is designed to be proportional to the diameter of first end 37a of opening 37 and first support section 41a is designed to be proportional to second end 37b of opening 37. It should also be appreciated by those with skill in the art that first support section 41a and second support section 41b may be removably attached to housing cover 36 by using commonly known means, such as threaded relationships, snap fittings or other attachment means.

Figure 10:
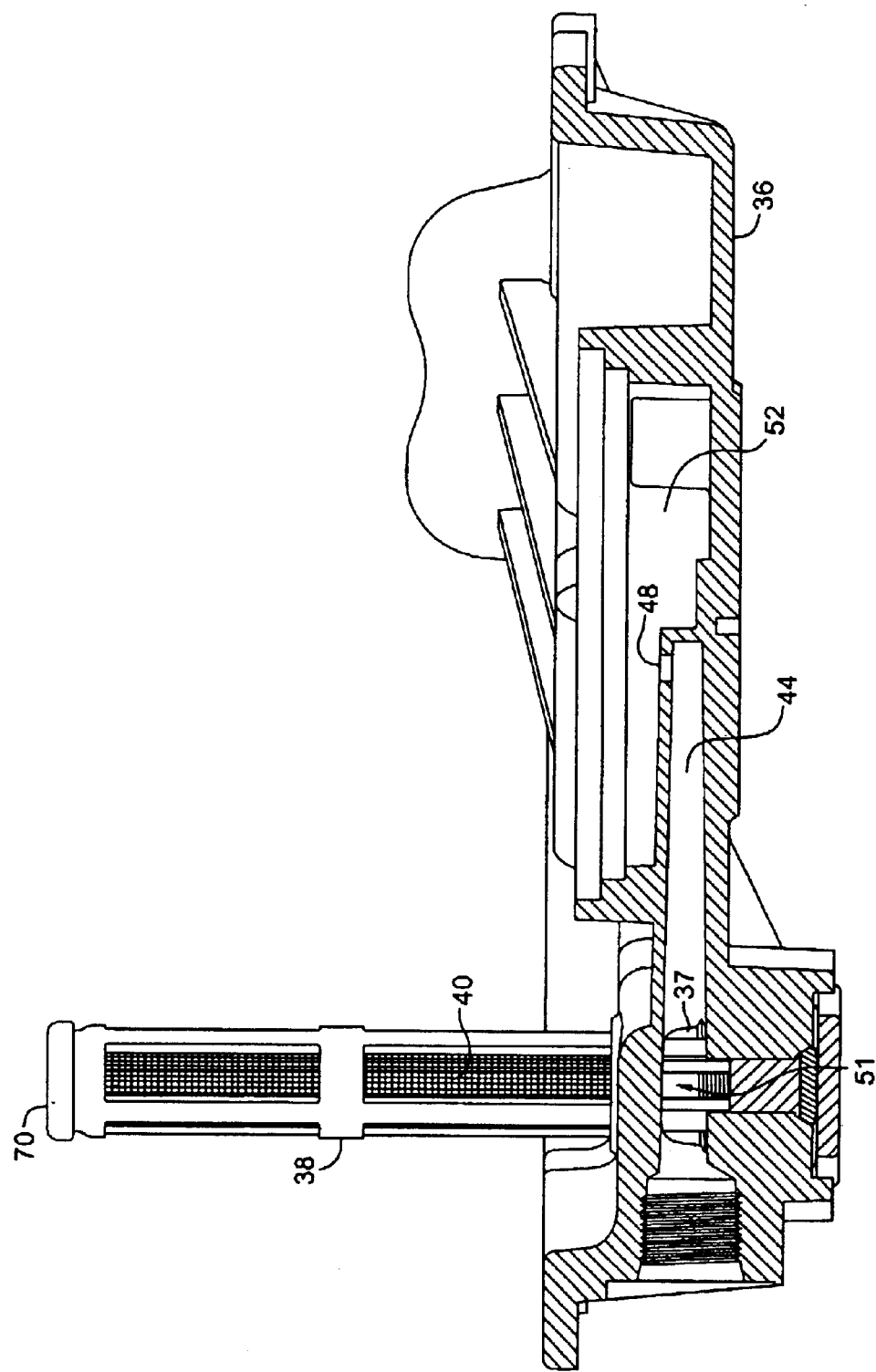
FIG. 10 is view similar to that shown in FIG. 9 showing an alternative design of the housing cover shown in FIG. 9.

In a configuration that does not require a charge pump, charge pump passage 46 may be eliminated and replaced by passage 48, as shown in FIG. 10. Therefore, passage 48 would lead directly to inlet manifold 52 and hydraulic fluid would be available to center section 17 via passage 48.

Figure 6:
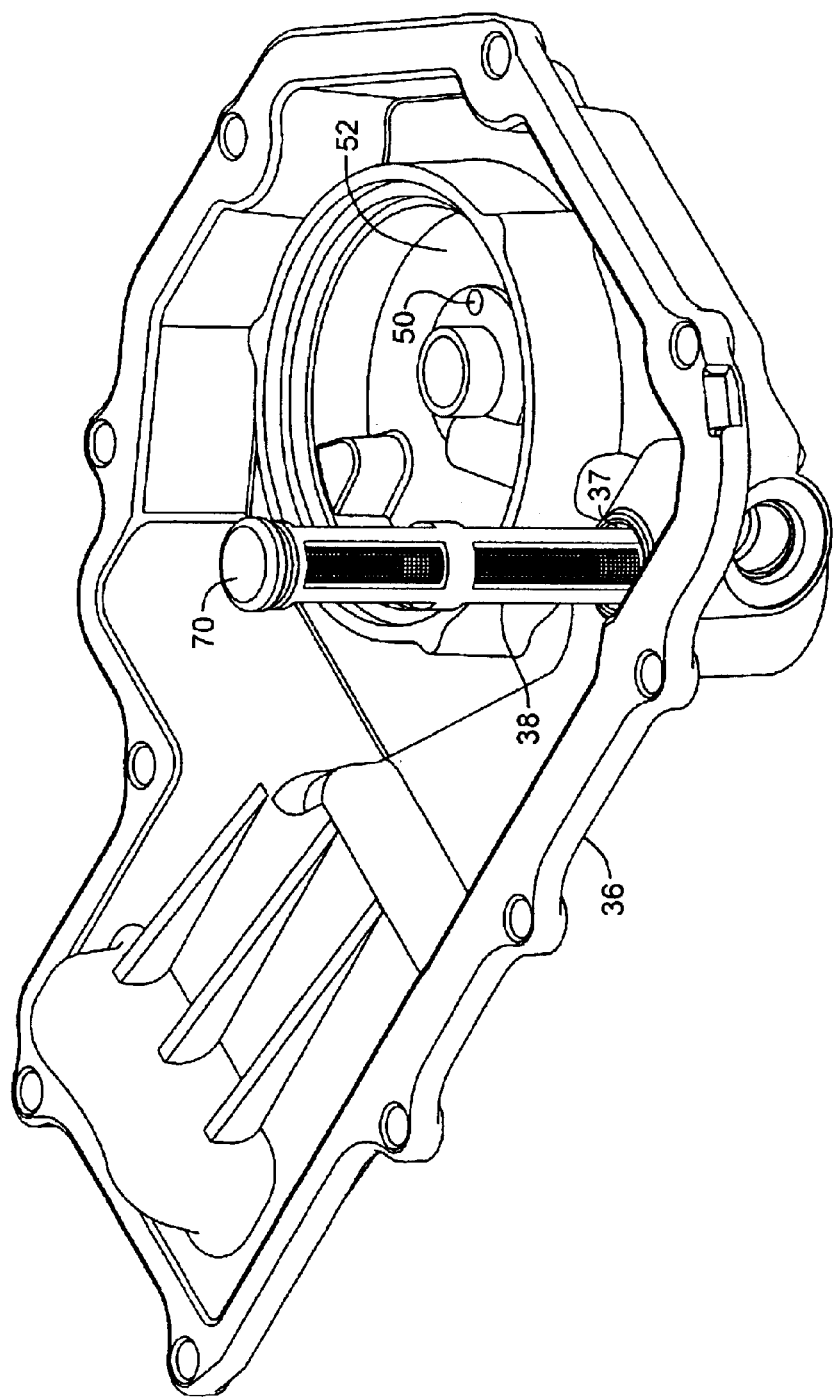
FIG. 6 is a perspective view of the present invention installed within a housing cover.
Figure 7:
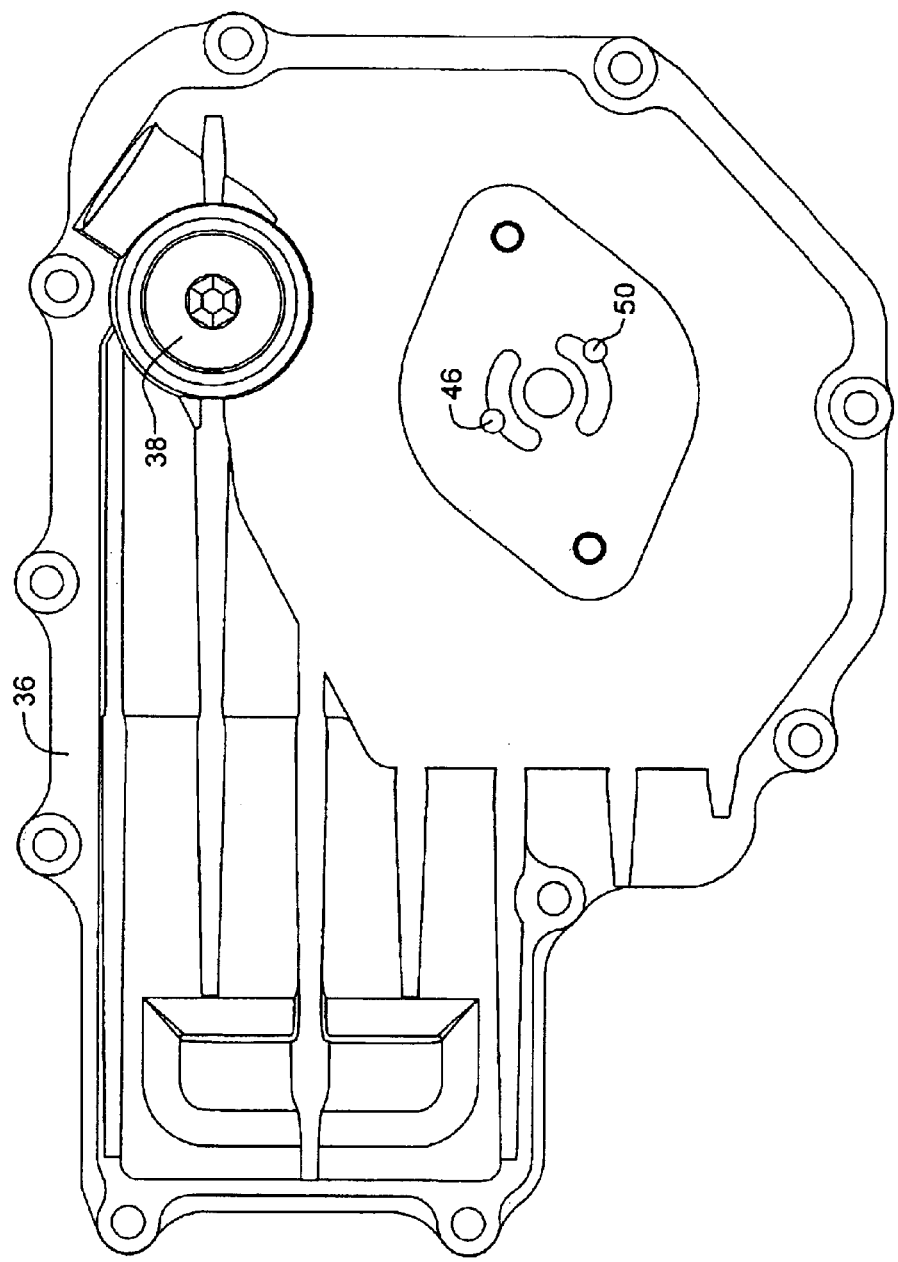
FIG. 7 is a bottom view of the housing cover shown in FIG. 6.
Figure 8:
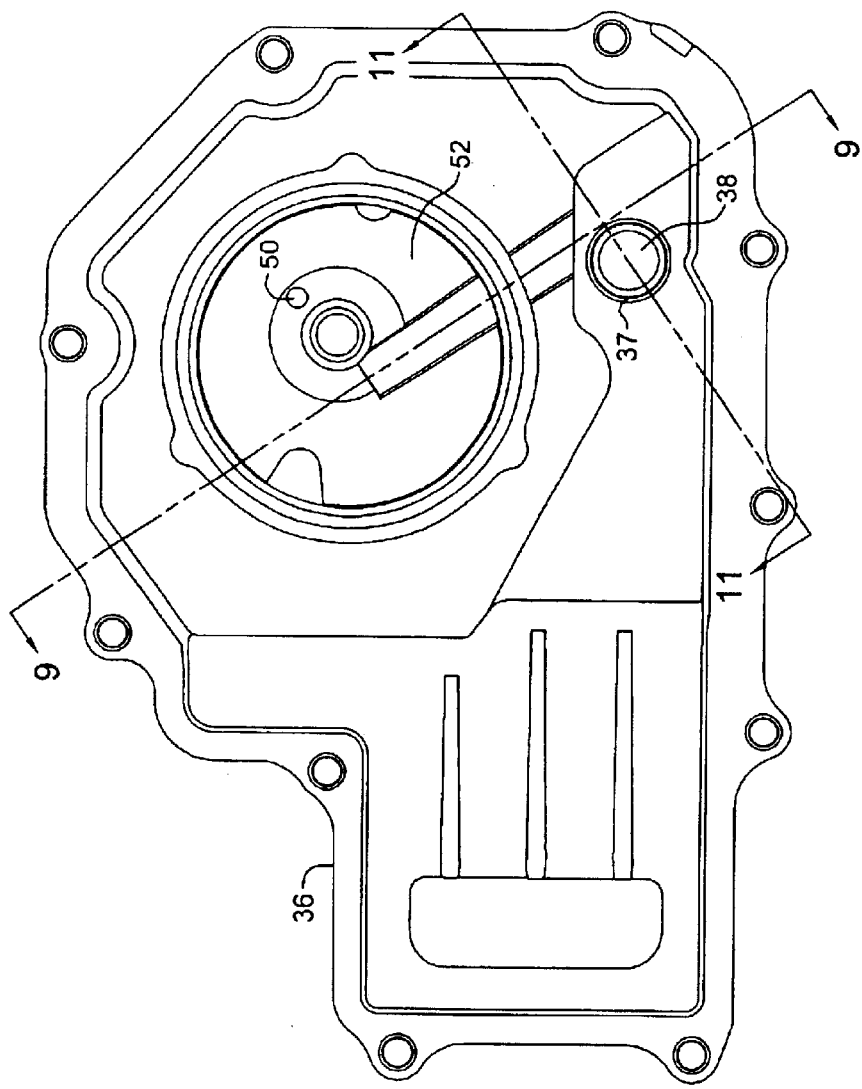
FIG. 8 is a top view of the housing cover shown in FIG. 6.

As shown in FIGS. 6, 7, and 8 in a configuration with a charge pump 34, hydraulic fluid under pressure would be forced into passage 50 by charge pump 34, and thus into inlet manifold 52 where the pressurized fluid would be available to center section 17. Inlet manifold 52 may be sealed in its interface with center section 17 to form a pressure container and also to prevent the entry of unfiltered fluid. In configurations including a charge pump, such as charge pump 34, there may also be a means of relieving excess pressure within inlet manifold 52, often called a charge relief. The charge relief may be provided as part of cover 36, as part of inlet manifold 52, as part of center section 17, or may be formed in or between one or more of these components, as a leakage path.

To prevent leakage of fluid from the intersection of filter 38 and cover 36, filter 38 mounts within cover 36 and o-ring 54 seals filter 38 to housing cover 36 in an SAE straight thread configuration, as shown in FIG. 11. In order to prevent fluid from bypassing filter media 40, first support section 41a of filter 38 may be provided with an interface surface 56 to contact a similarly configured surface 58 located within cover 36. Thus, when filter 38 is mounted to cover 36, surface 56 tightens against surface 58 and forms a seal sufficient to prevent contaminants from passing between these two surfaces. Depending on the tolerances of the associated components, the lower portion 60 of filter 38 may not contact surface 62 of housing 36. However, the tolerances of lower portion 60 and contact surface 62 are set such that o-ring 54 will provide a seal to prevent leakage from the housing, while also providing sufficient contact between surfaces 56 and 58 to prevent contaminants from passing through the interface between surfaces 56 and 58.

Figure 12:
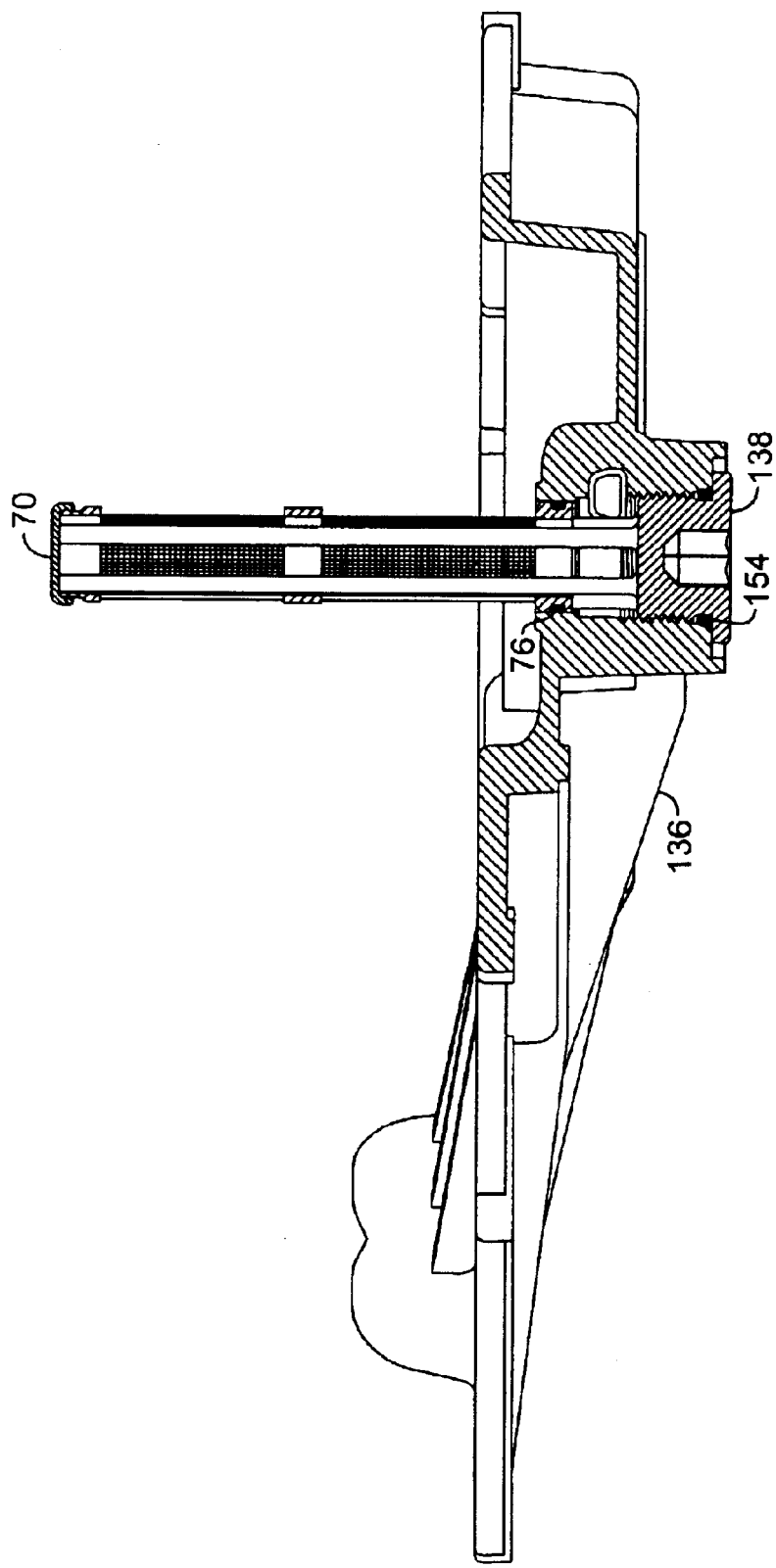
FIG. 12 is a view similar to that shown in FIG. 11 showing a second embodiment of an internal filter.
Figure 14:
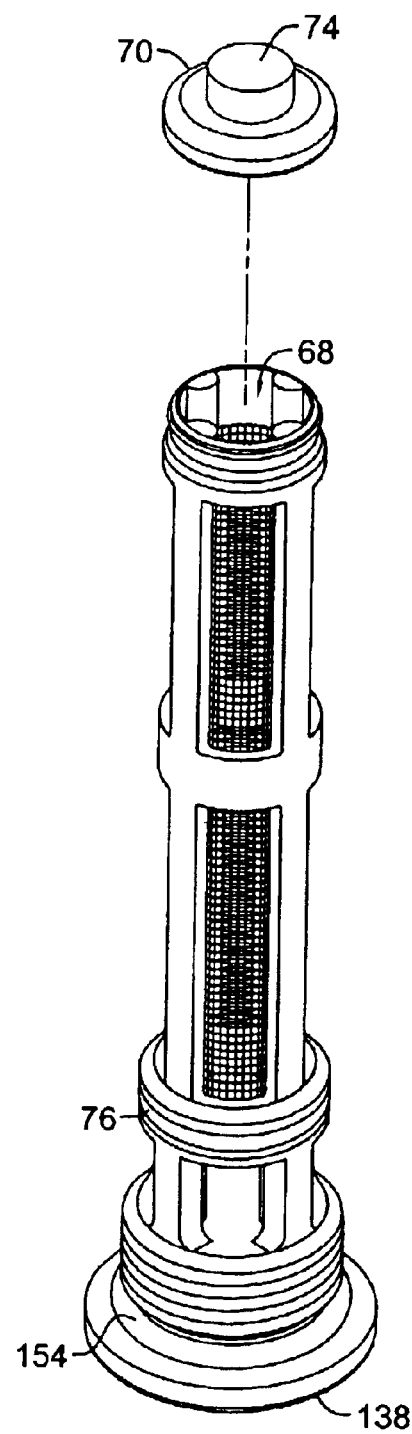
FIG. 14 is a perspective view of the internal filter shown in FIG. 12.

As shown in FIGS. 11 and 13, filter 38 includes longitudinal supports 64 and radial support 66. These portions of filter 38 provide strength and structure to support filter media 40 and paths for plastic flow during molding. To allow a portion of the mold to be extracted after filter 38 is formed, the end of filter 38 may also includes an opening 68. To separate the internal portions of filter 38 from the external portions of filter 38 opening 68 is covered by cap 70, which may interlock with a ridge 72 formed on filter 38 or may be attached by means of an adhesive or sealant or other means known in the art. A second embodiment of the present invention is shown in FIGS. 12 and 14. In this embodiment, an o-ring 76 provides a seal between filter 138 and housing cover 136 to prevent fluid from flowing from sump 29 to inlet manifold 52 without being pulled through filter media 40. This configuration also permits filter 138 to be fully tightened against housing 136, as compared to the first embodiment shown in FIG. 11. The embodiment shown in FIGS. 12 and 14 also includes o-ring 154 that functions similarly to o-ring 54 of the first embodiment.

As shown in FIG. 14, for removing ferrous particles from the fluid, a magnet 74 may be located at one or more locations on filter 38. Magnet 74 may be affixed to filter 38 with an adhesive or a variety of mechanical techniques, such as by threaded attachment, snap fitting or press fitting of magnet 74 to filter 38. Removing these particles may extend the life of the filter.

Figure 15:
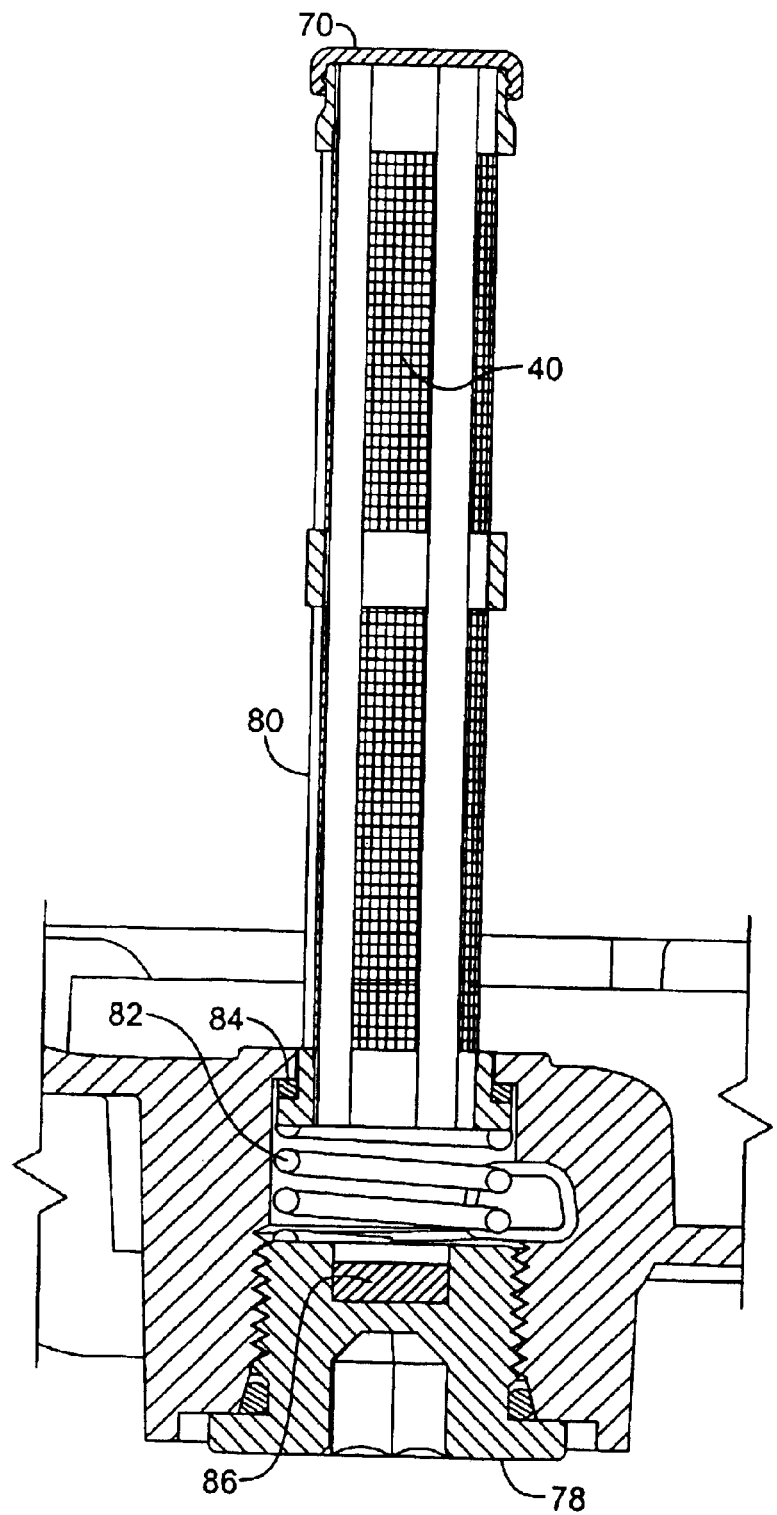
FIG. 15 is a section view of a third embodiment of an internal filter installed within a housing cover similar to that shown in FIG. 6.

FIG. 15 discloses a third embodiment of the internal filter having a cap portion 78 and a media portion 80. To compress gasket 84 and maintain media portion 80 in position, spring 82 provides a force against media portion 80. For removing ferrous impurities that pass through filter media 40, cap portion 78 may also include an internal magnet 86.

Figure 16:
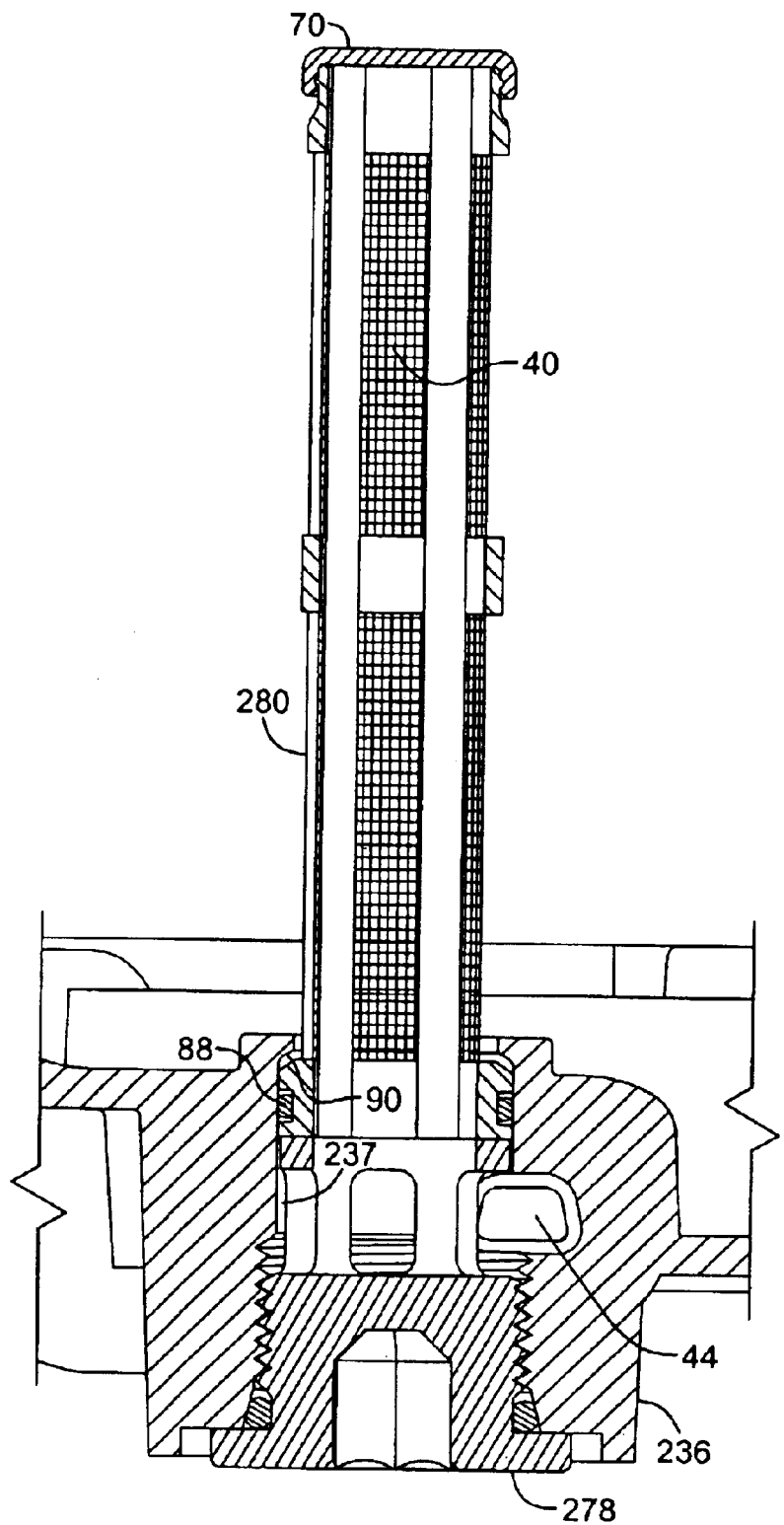
FIG. 16 is a section view of a fourth embodiment of an internal filter installed within a housing cover similar to that shown in FIG. 6.

FIG. 16 discloses a fourth embodiment of the internal filter also having a cap portion 278 and a media portion 280, but cap portion 278 constrains media portion 280 longitudinally at one side while housing 236 has a step 90 that constrains media portion 280 on the opposite side. In addition, the close fit of media portion 280 within bore 237 of cover 236 maintains the generally vertical orientation of media portion 280. To assure fluid is pulled through media 40 of media portion 280, o-ring 88 provides a seal between media portion 280 and housing 236.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention, which is to be given the full breadth of the appended claims and any equivalents thereof.

What is claimed is:

1. A hydraulic drive device comprising:
   a housing forming a sump and having an opening;
   a center section positioned within the sump and forming porting;
   an inlet passage formed within the housing to create a fluid inlet to the porting;
   a filter inserted through the opening and extending into the sump, the filter being located between the sump and the inlet passage and providing a fluid seal of the opening.

2. The hydraulic drive device of claim 1, further comprising an input shaft, wherein the filter is generally cylindrical and extends in a direction generally parallel to the input shaft.

3. The hydraulic drive device of claim 1, further comprising an output axle, wherein the filter is generally cylindrical and extends in a direction generally perpendicular to the output axle.

4. The hydraulic drive device of claim 1, wherein the filter further comprises:

a generally cylindrical body enclosing a volume, wherein the body comprises a plurality of openings that are in fluid communication with the sump;
   filter media covering the openings;
   a hole located at one end of the generally cylindrical body;
   a cap covering the hole; and
   a passage located at the other end of the generally cylindrical body that is in fluid communication with the openings and the fluid inlet to the porting.

5. The hydraulic drive device of claim 4, wherein the filter comprises a surface that contacts the housing to restrict fluid flow between the sump and the fluid inlet at the point of contact between the surface and the housing.

6. The hydraulic drive device of claim 4, wherein an o-ring is positioned between the filter and housing to restrict fluid flow between the sump and fluid inlet at the point of contact between the filter and the housing.

7. The hydraulic drive device of claim 4, wherein the filter further comprises a magnet.

8. The hydraulic drive device of claim 7, wherein the magnet is attached to the cap.

9. A hydraulic drive device comprising:
   a housing forming a sump and having an opening;
   a center section positioned within the sump and forming porting;
   an inlet passage formed within the housing to create a fluid inlet to the porting;
   a filter inserted through the opening and extending vertically into the sump, the filter being located between the sump and the inlet passage;
   wherein the filter is secured within the housing so that one portion of the filter is within the sump, one portion of the filter provides a fluid seal with the housing, and one portion of the filter is exterior to the sump.

10. The hydraulic drive device of claim 9, wherein the filter extends generally perpendicularly to the inlet passage.

11. The hydraulic drive device of claim 9, wherein the filter further comprises:
    a first end, a second end and a generally cylindrical body joining the first end and the second end, the cylindrical body enclosing a volume and further comprising a plurality of openings that are in fluid communication with the sump;
    filter media covering the openings; and
    a passage located at the second end of the generally cylindrical body, wherein the passage is in fluid communication with the openings and the fluid inlet to the porting.

12. The hydraulic drive device of claim 11, wherein the cooperation between the filter and the housing force fluid to enter the fluid inlet to the porting via the openings in the filter only.

13. A hydraulic drive device comprising:
    a housing forming a sump and having an opening;
    a center section positioned within the sump and forming porting;
    an inlet passage formed within the housing to create a fluid inlet to the porting;
    an opening in the housing having a first end and a second end, wherein the first end opens at an exterior surface of the housing and has a first diameter, and the second end opens at an interior surface of the housing and has a second diameter smaller than the first diameter; and
    a filter having a portion with a diameter that is sized to fit within the second diameter and that extends through the second end of the opening into the sump, and another portion that is sized to fit within the first diameter and positioned within the first end of the opening.

14. The hydraulic drive device of claim 13, wherein a cap covers the first end of the opening and provides a fluid seal.

15. The hydraulic drive device of claim 14, wherein the cap locates the filter within the housing opening.

16. The hydraulic drive device of claim 14, wherein a spring is located between the cap and the filter.

17. The hydraulic drive device of claim 14, wherein a magnet is attached to the cap.

18. The hydraulic drive device of claim 13, wherein a seal is positioned between the filter and the housing.

19. The hydraulic drive device of claim 18, wherein the filter is generally perpendicular to the inlet passage.

20. The filter as recited in claim 13, wherein the filter further comprises an o-ring positioned between the filter and the first end of the opening in the housing.

21. The hydraulic drive device of claim 13, wherein the fluid inlet is connected to a charge pump.

22. The hydraulic drive device of claim 21, wherein the charge pump is in fluid communication with a fluid manifold.

* * * * *